US006529706B1

(12) United States Patent
Mitchell (10) Patent No.: US 6,529,706 B1
(45) Date of Patent: Mar. 4, 2003

(54) AIRCRAFT SATELLITE COMMUNICATIONS SYSTEM FOR DISTRIBUTING INTERNET SERVICE FROM DIRECT BROADCAST SATELLITES

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/394,820

(22) Filed: Sep. 13, 1999

(51) Int. Cl.$^7$ .......................... H04B 7/185; H04Q 7/24; G10L 21/00; G06E 15/16; G06E 3/00
(52) U.S. Cl. .................. 455/12.1; 370/316; 370/338; 704/270.01; 709/227; 725/39
(58) Field of Search .................. 455/12.1; 370/316, 370/338; 704/270.1; 709/227; 725/39

(56) References Cited

U.S. PATENT DOCUMENTS

| | | | |
|---|---|---|---|
| 5,265,024 A | | 11/1993 | Crabill et al. ............... 364/443 |
| 5,760,819 A | | 6/1998 | Sklar et al. .................... 348/8 |
| 5,862,325 A | * | 1/1999 | Reed et al. ............... 704/270.1 |
| 5,991,596 A | * | 11/1999 | Cunningham et al. ..... 455/12.1 |
| 6,201,797 B1 | * | 3/2001 | Leuca et al. ................ 370/316 |
| 2001/0022783 A1 | * | 9/2001 | Ohki ........................... 370/338 |
| 2002/0056100 A1 | * | 5/2002 | Shimomura et al. .......... 725/39 |
| 2002/0069282 A1 | * | 6/2002 | Reisman ..................... 709/227 |

FOREIGN PATENT DOCUMENTS

EP 0890907 * 1/1999

* cited by examiner

Primary Examiner—William Cumming
(74) Attorney, Agent, or Firm—Nathan O. Jensen; Kyle Eppele (57) ABSTRACT

An aircraft satellite communications system for distributing Internet service and television programming from direct broadcast satellites to aircraft. The aircraft include a direct broadcast satellite receiver system, an aircraft computer network, and back-channel communications system equipment. The direct broadcast satellites receive uplink direct broadcast satellite television programming and Internet service from a direct broadcast satellite ground station that includes a direct broadcast satellite television program source and an Internet interface. A back-channel communications system provides communications with the aircraft to provide interactive Internet service to the aircraft over the back-channel communications system. A telephone system is connected to a back-channel communications system ground station and to a switch center connected to the telephone system and the Internet.

22 Claims, 5 Drawing Sheets

AIRCRAFT SATELLITE COMMUNICATIONS SYSTEM FOR DISTRIBUTING INTERNET SERVICE FROM DIRECT BROADCAST SATELLITES

BACKGROUND OF THE INVENTION

This invention relates to aircraft data delivery systems and in-flight entertainment systems and more specifically to a communications system for distributing Internet service from direct broadcast satellites (DBS) to aircraft in-flight. The aircraft satellite communications system can also be used to deliver direct broadcast satellite television programming and other data services and can be used in conjunction with current in-flight entertainment systems.

In-flight entertainment systems are known in the art. An in-flight entertainment system is described in U.S. Pat. No. 5,760,819 for "Distribution of a Large Number of Live Television Programs to Individual Passengers in an Aircraft" to Sklar et al assigned to the assignee of the present invention and is herein incorporated by reference in its entirety.

The Internet has become extremely popular and a need exists to add Internet service to aircraft, both business and air transport. The Internet is being sought as a necessity as well as an alternative to television.

Current stand-alone communications systems fielded in most aircraft lack the capacity or bandwidth to support true high-speed multi-user Internet browsing. These systems have been optimized for some data uses but are generally used to support low-bandwidth data and voice communications, typically ranging from 2400 bits per second to 19.2 kilobits per second.

Adding Internet service to a high-power wide-band direct broadcast satellite (DBS) system for aircraft use is therefore a desirable solution as it provides both a wireless means of connectivity to the aircraft and offers much higher bandwidth than existing low-bandwidth communications systems. The same direct broadcast satellite system can be used to simultaneously receive live television broadcasts and high-speed Internet service. Bandwidth for aircraft Internet users can come from idle capacity on high-power direct broadcast satellite transponders not fully used by video broadcasts. A typical DBS satellite may have 16 transponders, each with the capability of supporting up to 30 megabits per second. These transponders may each support several television channels. Each television channel may require 2 to 12 megabits per second. Depending on satellite transponder usage, several hundred kilobits to megabits may be available with access provided via a single television/data receiver system. Availability of this type of bandwidth is modest, fitting a limited user aviation market base well, where otherwise commercial market uses would generally out grow or require much more capacity. Some direct broadcast satellites blindly broadcast forward Internet data. Other interactive Internet and data service satellites are targeted to mass markets requiring significant satellite transponder usage, have lower EIRP (effective isotropic radiated power) signal strength and are narrowly spaced in frequency reuse and geostationary orbit, requiring relatively large antennas at the receiver, making these services a suboptimal option for aviation. Furthermore, the business case for mixing low-cost Internet browsing channels for casual use with high-cost media company digital TV channels is not strong, therefore there is currently low incentive to have both full interactive Internet channel capability and television placed on the same satellite. Additionally while relatively large antennas are acceptable in ground installations, these larger profile antennas would not be easily installed on aircraft or desired since they would adversely affect fuel efficiency.

Internet service may be in two forms. One form is broadcast or "push" Internet. Broadcast Internet is similar to a television station with the programming pre-arranged and continuously delivered. A computer addresses stored and real-time Internet broadcast data similar to tuning to a television channel. Broadcast Internet can be provided over portions of a direct' broadcast satellite television transponder channel. Full interactive Internet is the other form where a user requests or addresses an Internet site and receives or downloads the resulting data from the site for viewing. This interactive form of the Internet is most common and desirable. In addition to a direct broadcast satellite, interactive Internet requires an additional communications channel from the aircraft user to the Internet to accomplish this. A direct broadcast satellite television channel does not provide a needed back-channel air-to-ground communications link hence requiring a split communications approach.

What is needed is a direct broadcast satellite system that can provide high-speed ground-to-air Internet service to the aircraft along with DBS television programming simultaneously while using a small single antenna that can easily be mounted on the aircraft. Excess capacity on a DBS television transponder can be used to provide the modest bandwidth needs for Internet service. An additional low-speed air-to-ground communications channel is needed to enable a full interactive Internet capability.

SUMMARY OF THE INVENTION

An aircraft satellite communications system for distributing Internet service from direct broadcast satellites (DBS) is disclosed. The system is capable of simultaneously including DBS television programming and other data services as well. One or more aircraft may simultaneously use the aircraft satellite communications system. Each of the aircraft includes a direct broadcast satellite receiver system, an aircraft computer network, and radio equipment for a back-channel (air to ground) communications system. The aircraft satellite communications system may include one or more direct broadcast satellites. Each of the direct broadcast satellites receive uplinked direct broadcast satellite television programming, Internet service, and other data services on the same satellite and transmit satellite television programming, Internet service, and other data services to the direct broadcast satellite receiver system in the aircraft. A direct broadcast satellite ground station transmits uplink direct broadcast satellite television programming, Internet service, and other data services to the satellites. The direct broadcast satellite ground station further comprises a direct broadcast satellite television program source, an Internet interface, and other data services interface. A back-channel ground station for communicating with the aircraft and for receiving data communications from the aircraft over the back-channel may be included. A system interface connected to the back-channel ground station may be used for interfacing the public switched telephone network (PSTN) and the Internet.

It is an object of the present invention for an aircraft satellite communications system to provide Internet service to an aircraft from direct broadcast satellites.

It is an object of the present invention to provide full interactive Internet service as well as broadcast or push Internet.

It is an object of the present invention to provide Internet service and direct broadcast satellite television programming.

It is an advantage of the present invention to simultaneously provide Internet data and satellite television programming through a single small antenna easily mounted on an aircraft.

It is an advantage of the present invention to provide Internet service and television programming simultaneously on the same equipment.

It is a feature of the present invention to dynamically allocate channel loading to keep the available satellite bandwidth in full use.

It is a feature of the present invention to provide several other data sources such as weather data and stock market information on board an aircraft.

It is a feature of the present invention to deliver Internet and other data at high rates.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for an aircraft satellite communications system for distributing television programming, Internet service, and other data services from direct broadcast satellites. The aircraft satellite communications system of the present invention can be used for Internet service only or for television programming and Internet service. The invention is for an aircraft satellite communications system that can be used to add Internet service to the aircraft direct broadcast satellite television system currently manufactured by the assignee. The satellite television system is described in U.S. Pat. No. 5,760,819 previously cited.

The Internet is a network of millions of computers all over the world connected through many telephone systems and other means. The interconnection is collectively known as the Internet backbone. The Internet uses a network protocol called TCP/IP (transmission control protocol/Internet protocol). Every computer connected to the Internet uses TCP/IP to send to and receive data from other computers on the network. TCP/IP is a packet-switched network protocol. TCP breaks down the data message to be sent into smaller portions of data called packets with an address of both the sender and the receiver of the message. The IP protocol is used to transfer the data from the sender to the receiver through a series of routers. The routers receive a data packet, examine the destination address, and pass the data packet to the next router until the final destination is reached. The individual data packets are reassembled at the receiver using TCP to reconstruct the original message. The World Wide Web is a subset of the Internet and is a collection of linked Web sites that use an Internet protocol called HTTP (hypertext transfer protocol) to work together. HTTP is used to exchange text, images, sound, and video. Web site pages are exchanged by browsers that read the pages and servers that store the pages. Individual Web pages are combined to make up a Web site. The Web pages are written in HTML (Hypertext Markup Language). Hyperlinks connect Web pages to one another. The Web uses an addressing scheme that has an individual IP address to identify specific computers connected to the Internet. To get to a specific Web page on the Internet a precise address know as the URL (Uniform Resource Locator) is used. The URL tells the browser where to go on a server to find a desired Web page. The Internet works interactivity in a pulled mode where a browser looks at a Web page by going to the Web server where the page is stored and pulls it to the recipient computer for viewing. In the push or broadcast mode, the data arrives at a computer much like a television broadcast and the browser tunes to the broadcast. Several broadcasts may be available with different program data or media content.

Systems for delivering Internet service from direct broadcast satellites are commercially available. One available system is DIRECPC from Hughes Network Systems. A direct broadcast satellite Internet system 100 is shown in block diagram form in FIG. 1. In this system a client PC (personal computer) 110 requests a URL using the TCP/IP protocol over the telephone system 120 with a modem. The URL request has a tunneling code or address attached to it before it is sent to an Internet Service Provider (ISP) 125. The code tells the ISP 125 to forward the URL request over the Internet 130 to a network operations center (NOC) 140. The ISP 125 may be collocated with the network operations center 125. In usual Internet operations the URL request is sent to a requested Web site 150 instead of the network operations center 140. The network operations center 140 receives the URL request, removes the tunneling code, and then forwards the request over the Internet 130 to the appropriate Web site 150. The requested Web pages are then retrieved and sent to the network operations center 140. At the network operations center 140 the Web page data is uplinked to a direct broadcast satellite 150. From the DBS satellite the data is then transmitted to a small dish 115 and DBS receiver 117 at the client PC 110. A split communications system such as this has the advantage of speeding up Internet data delivery over the rates available over conventional telephone lines. This is due to the low-band width URL request from the client PC 110 delivered over the conventional telephone system 120 at slow rates and high-bandwidth large Web pages being delivered over a high data rate satellite link.

Figure 1:
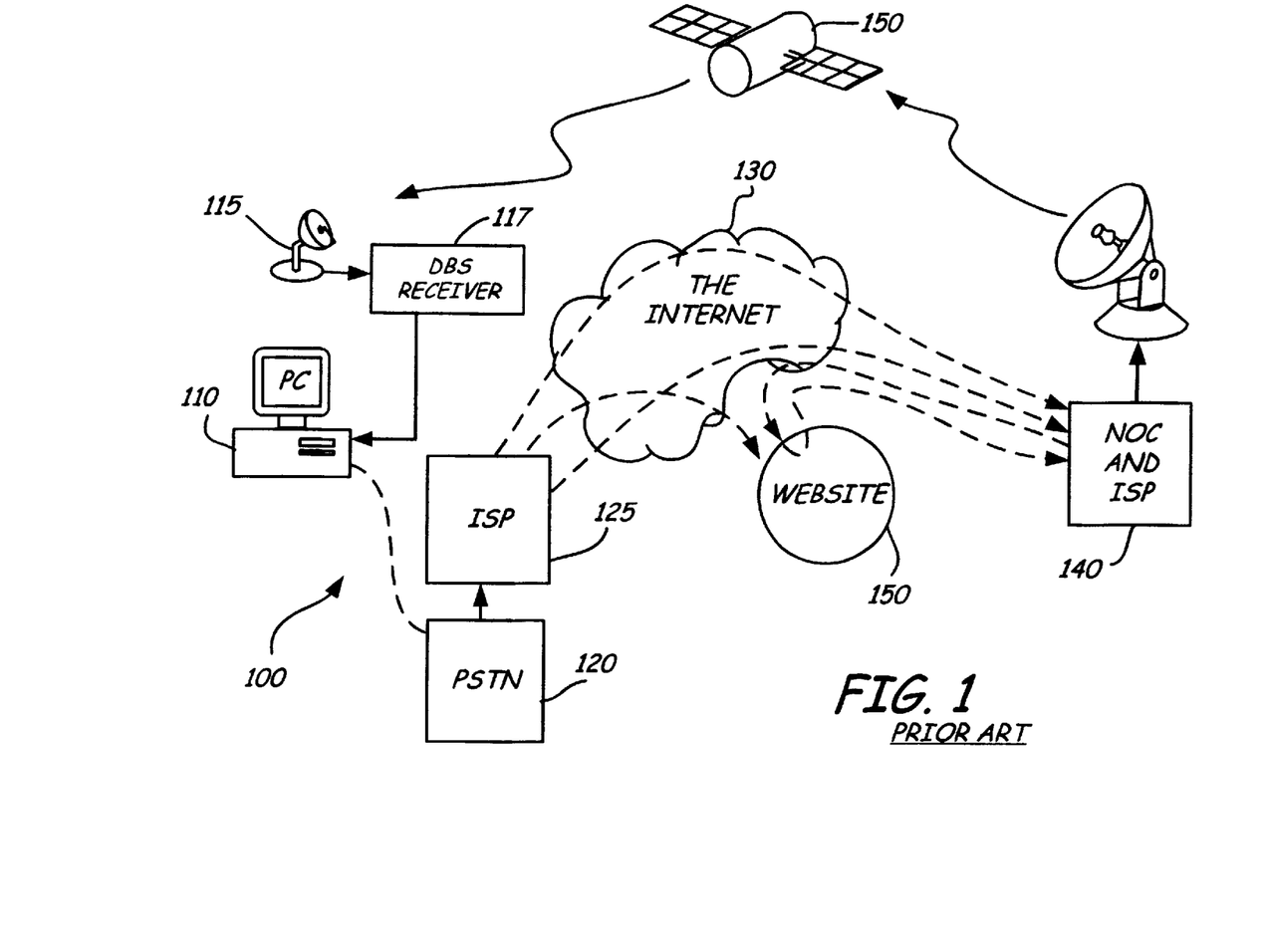
FIG. 1 is a diagram of a commercially available direct broadcast satellite system for delivering Internet service.

Current direct broadcast satellite systems for delivering Internet service to a terrestrial receiver as shown in FIG. 1 require a dish antenna of typically 21 to 35 inches in diameter at the client PC 110. Antenna design is generally optimized to satellite transponder power levels and the adjacent geostationary satellite spacing. For normal ground receiver use, these modest sized high-gain antennas (21 to 35 inches) are generally required for EIRP levels in the low 40-dBW range. In contrast, airborne antennas must be as small as possible, especially on business jet aircraft where drag must be minimized and installation space is limited. Mechanical antenna sizes currently used in direct broadcast satellite television systems installed on aircraft for in-flight entertainment systems are typically in the twelve-inch diameter range. One current system employs an 11.5-inch diameter gimble-mounted dish. This dish aperture size is inadequate for use with current satellite Internet service providers hosting service on lower power two- to three-degree frequency spaced geostationary satellites. As with digital television, higher power satellite transponders on satellites with wider nine-degree spaced frequency reuse are desired to reliably provide Internet service to aircraft equipped with small antennas. Many direct broadcast satellite television satellites are generally in a class that deliver the needed higher power and retain wider geostationary frequency reuse orbit spacing.

Figure 2:
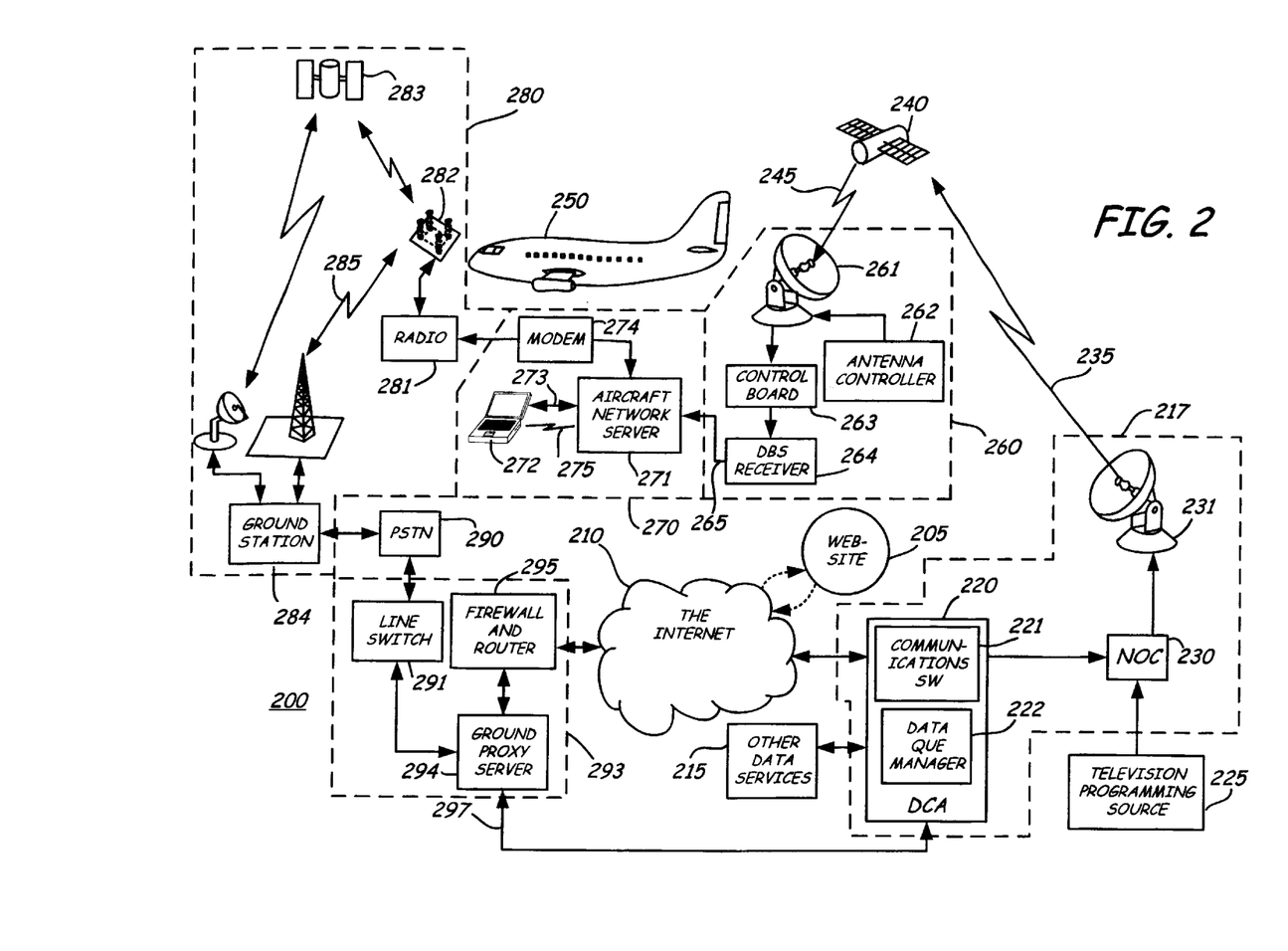
FIG. 2 is a diagram of an aircraft satellite communications system for distributing television programming and Internet service from direct broadcast satellites according to the present invention.

An embodiment of the current invention for delivering Internet service, television, and other data services to aircraft is show in FIG. 2. The aircraft satellite communications system 200 uses one or more high-power DBS television satellites 240, which allow the forward reception of push and interactive Internet data and television programming to an aircraft antenna and receiver system from the same satellite. In FIG. 2 a direct broadcast satellite ground station 217 forms a major part of the communications system and may include a communications data content aggregator 220, a network operations center 230, and an antenna system 231. The communications center data content aggregator (DCA) 220 interfaces the Internet 210. This communications center data content aggregator 220 functions as an aviation Internet service provider (ISP). In addition to interfacing the Internet 210, the communications center data content aggregator 220 may interface other dedicated data services 215 such as facsimile, e-mail, weather reports, stock reports, and agriculture commodity information. One supplier of Internet and data source interface services is Farm Journal-AgCast of Des Moines, Iowa. The communications center data content aggregator 220 contains communications software 221 that responds to a unique address code associated with a URL request from a client computer or PC (personal computer) or other computing device 272 received over a communications back-channel 280. The URL request instructs the data content aggregator 220 or another ISP (not shown) to acquire and deliver Internet data to a network operations center (NOC) 230 for uplinking to a direct broadcast satellite 240 for delivery to the client computer 272 on board an aircraft 250. The satellite communications system of the present invention may be used with more than one aircraft 250. More than one client computer or computing device 272 may be located on the aircraft 250. A data queue manager 222 schedules the data for each of the data services 215 or the Internet 210 on queue according to a preestablished priority. Data is forwarded over a dedicated telephone, a microwave link, or some other means to the direct broadcast satellite network operations center 230. The network operations center 230 sends the Internet service and other data services to a satellite 240 on an uplink 235 using the antenna system 231. A number of satellites 240 can be used to increase the geographical coverage or to offer additional channels. An aircraft 250 in flight may switch from one satellite 240 to another as determined by the coverage of each satellite and aircraft position as determined from available navigation systems. Regular direct broadcast satellite television programming may also uplinked on a number of channels to a satellite 240 from a television programming source 225.

The satellites 240 transmit forward Internet service aspects along with the other data services 215 and the regular direct broadcast satellite television programming 225 on a DBS down link 245 to the aircraft 250. Dynamic allocation of the bandwidth of the DBS down link 245 channels between core programming and the client computer 272 Internet users is maintained by the data queue manager 222. This dynamic allocation is done to assure that the bandwidth of the DBS channels never sits idle, maximizing revenue opportunity for an Internet service provider. A core set of programming is typically delivered to the aircraft 250 regardless if requested or not by a client computer 272. Core programming is defined as popular Web sites (Yahoo, E-bay pages etc.) and other popular data services. These pages are scheduled, updated, and replaced automatically. When a client computer 272 requires use of a portion of the bulk fixed contracted DBS down link bandwidth, channel priority is assigned to the client computer 272. This results in temporarily reduced core programming delivery until the client computer 272 relinquishes the channel back to core programming. This is done in real-time and is dynamic for any sized DBS channel usage and rate within the fixed DBS channel. The result is that this fixed DBS bandwidth is always in use allowing continuous revenue generation opportunity either from individual Internet users or from core programming content or advertising sponsors.

In FIG. 2 the aircraft 250 contains the equipment needed to receive the Internet service, other data services, and direct broadcast satellite television programming. A direct broadcast satellite receiver system 260 can be used as shown in FIG. 2 to just receive Internet service or to receive DBS television broadcasts and other data services as well. In an aircraft DBS receiver system 260, an antenna and antenna interface unit 261 receives the signals from the satellites 240. The antenna is mounted on the antenna interface unit to form the assembly 261. The antenna may a dish antenna or an electronically beam-steerable antenna. The antenna and antenna interface unit 261 down converts the Ku-band satellite signals into a 950 to 1450 MHz or L-band intermediate frequency (IF) signal. An antenna control unit 262 positions the antenna beam to track the satellite as the aircraft 250 maneuvers. A direct broadcast satellite receiver control board 263 allows control of the aircraft system receiver operation. The down converted L-band IF signal is sent to the direct broadcast satellite receiver 264 for processing of the Internet service and other data services. The DBS satellite receiver 264 may be configured to receive television programming as well as Internet and other data services. The direct broadcast satellite television programming or Internet service may be sent to an in-flight entertainment system as described in conjunction with FIG. 4.

The Internet service data from the satellite receiver 264 is passed on a serial data bus 265 to an aircraft computer network 270. Internet service may also be distributed over an aircraft in-flight entertainment described in conjunction with FIG. 4. The aircraft computer network includes a network server 271 that distributes Internet service and other data services in the aircraft 250 over an Ethernet or serial data bus 273 such as IEEE 1394. The client personal computer 272 may be connected to the data bus 273 or wireless network 275 for browsing the Internet.

The system configuration described up to this point in conjunction with FIG. 2 is suitable for broadcast or push Internet use only. If full interactive Internet is desired, some means of communicating from the client computer 272 or personnel computer (PC) or other user computing device to the Internet 210 is required to make browser URL requests. The means of communicating with the Internet 210 can be in the form of a communications back-channel 280. A modem 274 connected to the. aircraft network server 271 passes URL request data from the client computer 272 to the back-channel communications system 280. The URL requests from the client computer 272 may not be in TCP/IP protocol due to current sub-optimal back-channel bandwidth limitations. Future back-channel communications systems may supply the required bandwidth for true TCP/IP support. With current communications links, the client computer 272 is pre-assigned a fixed unique client address or user identification (ID) by the aircraft network server related to the current DBS satellite in use or tuned to, the aircraft tail number, a random user number or seat number, flight number, and date that a switch center 293 on the ground recognizes as an entitled user. A currently available back-channel communications system 280 is a SATCOM system such as INMARSAT. A phone radio 281 and associated antenna 282, on board the aircraft 250, transmit URL request data with fixed user ID to a SATCOM satellite 283 to an appropriate back-channel ground station 284. The back-channel communications system 280 may also be used for other data. The back-channel radio communications system 280 may also be a high frequency (HF) or a very high frequency (VHF) terrestrial communications link such as the AT&T NATS In-flight Telephony Network. The bandwidth of currently available VHF links is generally intended for voice also limiting the practical use of TCP/IP protocol on the link as is the case with current low-speed SATCOM data links. Many back-channel ground stations 284 may be required across a geographical area to provide the needed contiguous coverage.

The URL request data inputs from the back-channel communications system 280 are passed over a telephone system such as the public switched telephone network (PSTN) 290 or via the Internet to a switch center 293 to access the Internet 210. The telephone system 290 may be connected to an existing Internet service provider (ISP) (not shown) to interface the Internet. The telephone system may also be replaced with a microwave link, a direct line, or some other means of communicating with the switch center 293. The back-channel ground station 284 may be collocated with the switch center 293 eliminating the need for a communications link. At the switch center 293, a telephone line switch 291 selects URL request data inputs to the switch center from the back-channel ground stations 284 connected to the various back-channel communications links with signals originating from multiple aircraft and client users of the system. The telephone line switch 291 outputs are connected to a ground proxy computer 294. The ground proxy computer 294 is a proxy server that acts as an intermediary between the client computer 272 and the Internet 210 and essentially hosts the actual Internet session desired by the client computer 272. The ground proxy computer 294 translates the URL request data and unique user address ID from the client computer 272 and server 271 into the TCP/IP protocol and temporarily assigns, using DHCP (dynamic host configuration protocol) or IP auto configuration, the client computer 272 with a fixed unique temporary 32-bit IP address. A firewall and router 295 is used to protect and route information within the switch center 293. The switch center 293 sends the requested URL Web pages to the data content aggregator 220 over the Internet 210. Telephone lines, a microwave link, or some other communications link 297 may also be used. The switch center 293 may be collocated with the data content aggregator 220 and directly transfer the requested URL Web pages to the data content aggregator 220.

The present invention does not exclude using a pure TPC/IP protocol with the split communications architecture with the DBS link 245 in FIG. 2 as a means to the aircraft 250 and INMARSAT, NATS, or HF back-channel 280 as a means from the aircraft 250. A faster more unique and robust communications architecture better suited for remote wireless airborne applications is instead preferred. The system is best visualized as the aircraft Internet user having two remote wireless communications channels to and from a ground proxy computer 294, that is having the "true" real-time TCP/IP Internet session. This ground proxy computer 294 can be located at the network operations center 230 on the ground, and may be capable of hosting several unique Internet sessions (one for each unique airborne/ aircraft client computer 272 user). The aircraft satellite communications system invention can use INMARSAT, which may include the option of using a low-cost X.25 packet data mode 3 INMARSAT link for the back-channel 280. Although this back-channel 280 can support IP header routing and control information and associated datagram delivery as defined by IETF RFC791, it can be shown that the header data traffic alone requires an appreciable percentage of available bandwidth significantly reducing information rate throughput under otherwise good forward channel conditions. Generally airborne wireless communications systems suffer bandwidth restriction issues, many times limiting data rates at or below 9600 baud or as low as 300 with HF communications. If Internet protocol is used with these types of narrow-band RF wireless air-to-ground (ATG) back-channel links, information throughput greatly suffers even if the ground-to-air (GTA) forward-channel supports wide band data. Even though a true TCP/IP session can be established via these low speed links, the time to download a typical homepage may take as many as 5 minutes at highly unattractive costs (usually several dollars to tens of dollars per minute). Usage of the Internet protocol (which has been optimized for higher communications channel data rates—above 9600 baud) is thus best limited to only the communications link between the ground proxy server 294 and the Internet 210. The asymmetrical split wireless communications channels (wide-band direct broadcast satellite for the GTA link 235 and INMARSAT, NATS, or HF for the ATG link) best serve as a file request and delivery avenue not engaging in the frequent TCP packet protocol overhead. Error checking and correcting is instead more optimally done at the file or even at the page level, greatly reducing the channel overhead and opening up the narrow band back-channel bottleneck. Any absent or corrupt files may be identified by a checksum scheme at the aircraft network server 271 and again requested or until a timeout occurs. Very large files, streaming audio or streaming video as a few examples, may be divided, delivered and error corrected via several appendable files by a subsystem of the ground proxy server 294. These files are then brought through a reverse process once onboard the aircraft server 271.

Standard Internet communications and browsing routinely leads to the reception by the client computer 272 in FIG. 2 of graphical files requiring significant amounts of bandwidth on the satellite uplink 235 and the DBS down link 245 to aircraft 250. Graphical files typically encountered on the Internet generally have not been optimized in file size or image quality, particularly for delivery over bandwidth restricted channels. The ground proxy server 294 may reduce this problem by compression of graphical Internet files prior to delivery to the data content aggregator 220 and forwarding to the client computer 272 on board the aircraft 250. The ground proxy server 294 conserves bandwidth and increases Internet browsing speed on board an aircraft by preprocessing in realtime Internet graphical files into reduced file sizes. This compression may or may not affect graphical image quality received by the client computer 272 and does not affect textual information. The compression rate may be pre-selected by the client computer 272 or the ground proxy server 294 to obtain a desired image compression quality. The requested Internet files are recognized by the ground proxy server 294 as graphics and are processed in real time automatically. The data compression techniques used may include but are not limited to wavelet algorithms, fractal.algorithms, image resizing, JPEG (Joint Photographic Experts Group), MPEG (Motion Picture Experts Group) and JPEG 2000. The client computer 272 appears to have a normal Internet session when real-time data compression is in use and the graphics files have been reduced in size, however physical image sizes displayed by the browser remain unchanged.

To summarize operation of the aircraft satellite communications system of the present invention, the client computer 272 browses the Internet and makes a URL request over the aircraft data bus 273 to the aircraft network server 271. The network server 271 attaches the unique identification (ID) (non-IP, e.g. current in-use DBS satellite ID, aircraft tail number, flight number, date, and temporary session client number) for the client computer 272 to the request and sends it on its modem 274 to aircraft back-channel radio 281 in some format compatible with the radio 281. The radio 281 forwards the request through a SATCOM satellite 283 if a SATCOM link is in use. The satellite 283 beams request down to the SATCOM ground station 284. At the back-channel ground station 284, the URL request is received and translated to a phone line in the public switched telephone network (PSTN) 290. The URL request on the telephone network 290 is sent to the switch center 293 where the line switch 291 selects an available line for the client computer 272. The URL request then goes to the ground proxy server 294. The ground proxy server 294 receives the URL request and temporary client request and acts as client on behalf of the client computer 272 by temporarily assigning an actual IP address for that session and forwards the request to the Internet 210. The URL request is forwarded to the requested Web site 205, the selected Web page is retrieved and forwarded via the Internet 210 to the data content aggregator 220, a part of the direct broadcast satellite ground station 217, using tunneling software. The selected Web page may be sent to the data content aggregator 220 over telephones, a microwave link or some other communications link 297. The ground proxy server 294 may be collocated at the data content aggregator 220 and directly transfer the selected Web page. At the data content aggregator 220 the data queue manager 222 is pre-programmed to weigh and select data from the other data services 215 or the selected Web page, using a priority algorithm, to be forwarded to the respective DBS satellite in use as identified by the unique client computer address. The data is sent to the network operations center (NOC) 230 contained in the direct broadcast satellite ground station 217. The network operations center 230 uplinks the requested Web page data to the appropriate DBS satellite 240 using the unique client computer address or ID along with other optional data services 215 and television programming 225 on a Ku-band uplink. The DBS satellite 240 broadcasts the uplinked data to the aircraft 250 aircraft antenna and antenna interface unit 261. The received Ku-band signal is down converted at the antenna and antenna interface unit 261 to an L-band IF signal and passed to the DBS receiver 264 where the Web page data is demodulated and passed over the data bus 265 to the aircraft network server 271. The Web page is placed in a directory allowing random access or immediate direct delivery to the requesting client computer 272.

Figure 3:
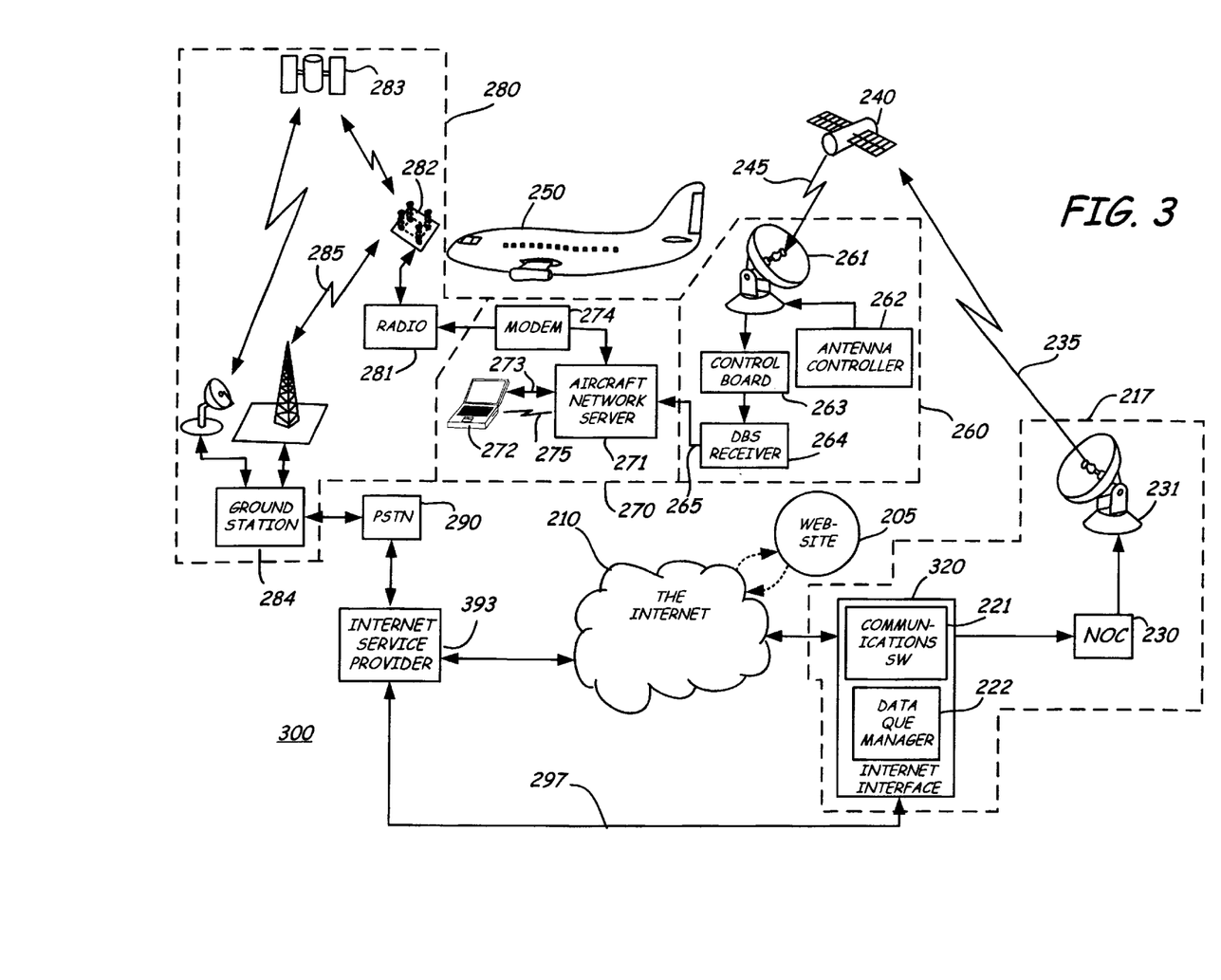
FIG. 3 is a diagram of an alternate aircraft satellite communications system for distributing Internet service from direct broadcast satellites according to the present invention.

With the aircraft satellite communications system 200 for distributing television programming and Internet service from direct broadcast satellites described in conjunction with FIG. 2, live direct broadcast satellite television programs and interactive Internet service can be received simultaneously. In FIG. 3 an alternate aircraft satellite communications system 300 for distributing Internet service from direct broadcast satellites according to the present invention is also disclosed. Several elements of the alternate aircraft satellite communications system 300 are the same as that described and disclosed in conjunction with FIG. 2. The elements of the systems in the two figures that are identical retain the same reference numbers in FIG. 3. Those elements of the system that may differ between the two systems are noted as a 300 number in FIG. 3. The invention disclosed in FIG. 3 uses an Internet direct broadcast satellite provider such as the Hughes Network Systems DIRECRC system described in conjunction with FIG. 1. The embodiment of the invention in FIG. 3 assumes that the satellite that the Internet DBS provider is using, has sufficient transponder power to enable the use of a small aircraft dish antenna 261 or other beam-steerable antenna system. The system works much like that described in conjunction with FIG. 2. However DBS TV is not included from the same satellite with current available systems. If television programming is desired another satellite providing such programming must be used and additional aircraft equipment to receive the programming must be installed. A direct broadcast satellite ground station 217 that may include an Internet interface 320, a network operations center (NOC) 230, and an antenna system 231. The Internet DBS provider uses the Internet interface 320 with communications software 221 and a data queue manager 222 to interface the Internet 210 and pass URL requests to the network operations center 230. The network operations center 230 uplinks the Internet data to a satellite 340 where it is broadcast normally to ground based users as shown in FIG. 1. Satellite 340 in FIG. 3 differs from the satellite 240 in FIG. 2 in that it does not have television programming. In FIG. 1 the ground-based client computer 110 receives the Internet data from the satellite 150 on a DBS satellite receiver 117. Telephone lines 120 from the ground user to the ISP are used to send URL requests from the client computer 110 to an ISP 125 and the Internet 130. In the present invention, the satellite 340 transmits the Internet data to the aircraft 250. The DBS receiver system 260 on board the aircraft 250 receives the satellite Internet service with the antenna and antenna interface unit 261. The antenna control unit 262 keeps the antenna 261 pointed at the satellite 340. The DBS receiver control board 263 controls the receiver and the Internet service is processed with Internet DBS receiver 364. The Internet DBS receiver 364 differs from the DBS receiver 264 in FIG. 2 in that it is not capable of receiving television programming.

The Internet data from the Internet DBS receiver 364 is passed on the serial data link 265 to aircraft computer network 270 consisting of an aircraft network server 271 hosting DIRECPC. The aircraft network server distributes Internet service in the aircraft 250 over an Ethernet or serial data link 273 such as IEEE 1394. The client personal computer or computing device 272 may be connected to the data link 273 for browsing the Internet and other network functions. This portion of the aircraft equipment is the same as in FIG. 2.

The communications back-channel 280 is also included in the embodiment of the invention shown in FIG. 3. The modem 274 in aircraft computer network 270 passes data from the client computer 272 to the back-channel communications system 280. The back-channel communications system 280 can be a SATCOM phone radio 281 and associated antenna 282 to transmit data over a SATCOM satellite 283 such as INMARSAT to an appropriate ground station 284. The back-channel radio communications system 280 may also be a high frequency (HF) or very high frequency (VHF) terrestrial communications link 285 such as the AT&T NATS In-flight Telephony Network. This portion of the aircraft equipment is the same as in FIG. 2.

The data output from the back-channel communications system is passed over a telephone system such as PSTN 290 to an Internet service provider (ISP) 393 to interface the Internet 210 as in FIG. 2. The ISP 393 transfers requested Web pages over the Internet 210 to the Internet interface 320. Telephone lines, a microwave link, or other communications link 297 may be used. The ISP 393 may be collocated with the Internet interface 320 and directly transfer the requested Web pages.

Figure 4:
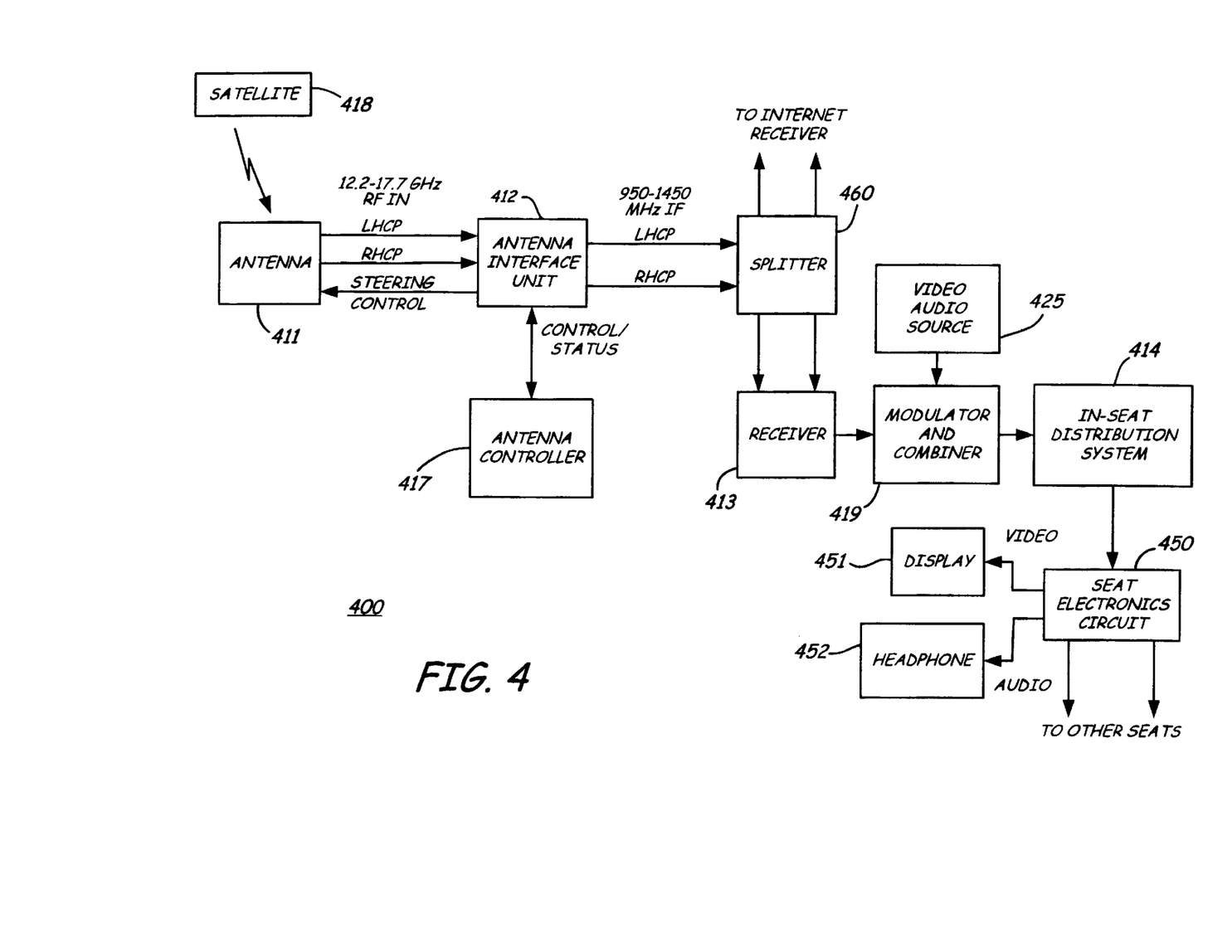
FIG. 4 is block diagram of an satellite television system as used in an in-flight entertainment system as installed on an aircraft showing how the current invention can be used with the satellite television system.

The aircraft satellite communications system of the present invention can be used with existing in-flight entertainment systems. A satellite television system 400 for receiving DBS television programming is shown in FIG. 4 as disclosed in U.S. Pat. No. 5,760,819 previously cited. The satellite television system 400 provides live television programming to individual seats on an aircraft and permits individual selection of channels by passengers.

The satellite television system 400 comprises an antenna 411 that is disposed adjacent the surface of the aircraft. The antenna 411 is pointed at satellites 418, such as Hughes or Echostar satellites for example, that are part of the existing direct broadcast satellite (DBS) system. The antenna 411 beam is steered so that it is locked onto the RF signal transmitted by the satellite 418. The receiver system 400 may provide signal strength feedback assisting in maintaining an optimal link including a serial word or audio tone indicating a signal strength. The antenna 411 is controlled by an antenna controller 417 that sends control signals and processes status signals to and from the antenna 411 by way of an antenna interface unit 412. The antenna 411 may be mounted on the antenna interface unit 412. The antenna 411 may be an electronically beam-steered antenna or a mechanically beam-steered antenna. The antenna interface unit 412 down converts received MPEG-encoded (compressed) RF signals to provide left hand circularly polarized RF signals and right hand circularly polarized RF signals that contain different sets of encoded television channels. The received encoded (compressed) RF signals are in the 12.2–12.7-GHz band that is down converted to IF signals in the 950–1450 MHz band commonly referred to as L-band.

The down converted encoded IF signals are processed by a receiver 413, which does not decode or D/A convert them, to produce encoded video and audio signals corresponding to a plurality of encoded television channels. The encoded (compressed) video and audio signals are modulated by a modulator 419, which also is used as a combiner, to modulate signals derived from other video and audio sources 425, such as video and audio tape players. The modulated and encoded video and audio signals are then routed to an in-seat video and audio distribution system 414 that distributes them to each passenger's seat.

Seat electronics circuitry 450 is located at each passenger's seat. The seat electronics circuitry 450 demodulates, decodes and converts the modulated and encoded video and audio signals into signals that may be viewed and heard by the passenger at that seat by way of a display 451 and head phones 452.

In operation, the receiver serves to receive IF signal from the antenna 411, but does not provide MPEG decoding or digital-to-analog conversion processes. The output of the receiver 413, rather than a baseband video and analog audio output representing a single television program, includes two serial data streams, one for each polarization. These MPEG-encoded data streams include all of the live television programming provided by the satellites 418.

The encoded data streams are applied to the RF modulator 419 along with signals from other entertainment sources such as video and audio regarding safety announcements or digital game data, for example. All of these signals are separately modulated and combined onto a single carrier. The resulting signal is distributed to the passengers by means of the in-seat video and audio distribution system 414.

At each passenger seat or seat group, the signal is processed by the seat electronics circuitry 450 wherein it is demodulated and processed appropriately according to individual signal type. For example, the baseband video and audio from video tape players may be applied to a tuner and converted to a form appropriate for use by the seat's display 451 and the passenger's headphones 452. In the case of MPEG-encoded live television data streams an MPEG decoder and digital-to-analog converters located within the seat electronics circuitry 450 process the signals and generate baseband video and analog audio for use by the passengers. Since all television channels received from the satellites 418 are contained within the data streams, each passenger can select any particular channel, without affecting other passengers.

An aircraft satellite communications system for distributing the Internet service can be added to an existing in-flight entertainment system shown in FIG. 4. The antenna 411 receives Internet service along with television programming. The antenna interface unit down converts the signals to L-band IF signals as before. A splitter 460 can be inserted between the antenna interface unit 412 and the receiver 413 to tap off the L-band IF. The L-band IF output from the splitter 460 is fed to the DBS receiver 264 in FIG. 2 and to the receiver 413 in FIG. 4. The split L-band IF outputs contain both television programming signals and the Internet service. The antenna 411 and antenna interface unit 413 of FIG. 4 replace the antenna 261 of FIG. 2. Antenna controller 417 replaces antenna controller 262 in FIG. 2. Operation of the aircraft satellite communications system for distributing the Internet of the present invention remains the same as previously discussed.

Figure 5:
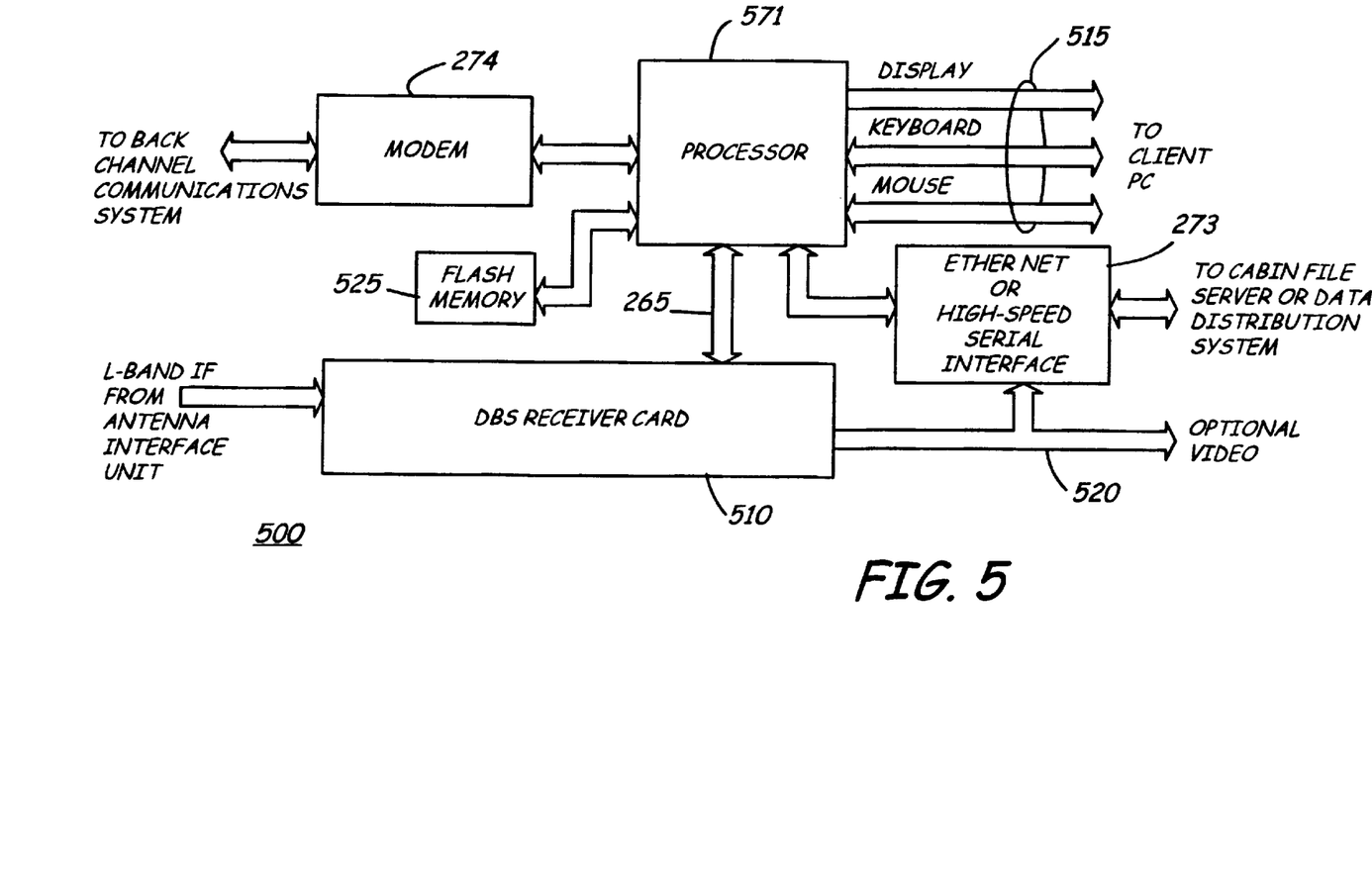
FIG. 5 is a hardware block diagram of a satellite receiver decoder unit combining some of the elements of FIGS. 2 and 3 into a single unit.

FIG. 5 shows a receiver decoder unit 500 that can be used in either system embodiment shown in FIGS. 2 and 3. The receiver decoder unit 500 combines several of the functions shown in FIGS. 2 and 3 into one unit on board an aircraft 250. The L-band IF-signal from the antenna interface unit 261 of FIGS. 2 and 3 is connected to a DBS receiver card 510 that can be either 264 or 364 of FIG. 2 or 3 respectively. This DBS receiver card 510 can be but not limited to DBS TV programming such as Hughes DIRECTV or Echostar Dish Network or DBS Internet service such as DIRECPC. The serial link 265 between the DBS receiver card 510 and the processor 571 can be a PCI interface or a USB interface. The processor 571 functions as the aircraft network server 271 of FIGS. 2 and 3. Flash memory 525 may be used to store media content or Internet files used for a browser directory. The processor 571 may be directly connected to a client computer 272 through an optional direct connection 515. An Ethernet or high-speed serial interface 273 can be used to interface to an additional a cabin file server function or a data distribution system facilitating in-seat video distribution. A modem 274 is connected to the processor 571 and to the back-channel communications system 280 to provide full interactive Internet service. The modem 274 and the back-channel communications system 280 are not required in a broadcast only Internet application option.

The receiver card 510 in FIG. 5 may also include a one-way high-speed data output option 520 that may be used to deliver television programming or Internet service. Using a DBS receiver card 510 with this data output option 520 allows a single board hardware solution for delivering both television programming and Internet service.

It is believed that the aircraft satellite communications system for distributing direct broadcast satellite Internet service from direct broadcast satellites of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An aircraft satellite system for distributing a direct broadcast satellite Internet service from an Internet to an aircraft comprising:
   the aircraft further comprising a direct broadcast satellite receiver system, back-channel communications system equipment, and an aircraft computer network said aircraft computer network further comprising:
      a serial data bus connected to the direct broadcast satellite receiver system for distributing the Internet service;
      an aircraft network server connected to the serial data bus for receiving the Internet service;
      a modem connected to the aircraft network server for sending and receiving data on the back-channel communications system equipment; and
      a client computer connected to the aircraft network server for browsing the Internet, entering URL requests, and receiving Internet service;
   a direct broadcast satellite said direct broadcast satellite transmitting the direct broadcast satellite Internet service to the direct broadcast satellite receiver system in the aircraft;
   a direct broadcast satellite ground station for transmitting the direct broadcast satellite Internet service to the direct broadcast satellite; and
   a wireless back-channel communications system for providing an interactive Internet service for the aircraft computer network using a unique ID for a client computer URL request said back-channel communications system further comprising a back-channel ground station for communicating with the aircraft wherein the back-channel communications system receives data from the modem comprising URL requests from the client computer and sends the URL request data to the back-channel ground station.

2. The aircraft satellite communications system of claim 1 wherein the aircraft back-channel communications system equipment further comprises:
   a radio connected to the aircraft computer network for receiving data from the aircraft computer network and generating a data signal; and
   an antenna connected to the radio for transmitting the data signal to the back-channel ground station.

3. The aircraft satellite communications system of claim 1 wherein the back-channel communications system is one of a satellite communications system, a high frequency radio communications system, and a very high frequency terrestrial radio communication system.

4. The aircraft satellite communications system of claim 1 wherein the direct broadcast receiver system on the aircraft further comprises:
   an antenna and antenna interface unit for receiving the direct broadcast satellite Internet service, for positioning the antenna beam, and for down converting the direct broadcast satellite Internet service;
   an antenna control unit for controlling the antenna so that the antenna beam constantly points at the direct broadcast satellite; and
   a direct broadcast satellite receiver connected to the antenna and antenna interface unit for processing the down converted Internet service.

5. The aircraft satellite communications system of claim 4 wherein the direct broadcast satellite transmits television programming to the direct broadcast satellite receiver system in the aircraft and the direct broadcast satellite ground station provides television programming to the direct broadcast satellite.

6. The aircraft satellite communications system of claim 5 wherein the antenna and antenna interface unit further receives direct broadcast satellite television programming from the direct broadcast satellites and down converts the direct broadcast satellite television programming.

7. The aircraft satellite communications system of claim 6 wherein the direct broadcast satellite receiver further processes the direct broadcast satellite television programming and provides a high speed data output for the television programming and Internet service.

8. The aircraft satellite communications system of claim 1 further comprising a telephone system connected to the back-channel ground station for receiving the URL request data and for interfacing the Internet.

9. The aircraft satellite communications system of claim 8 wherein the telephone system is connected to a switch center for interfacing the Internet said switch center further comprising:
   a telephone switch for selecting the URL request data from the back-channel ground station;
   a ground proxy server connected to the telephone switch said ground proxy server acting as an intermediary between the client computer and the Internet, translating the client computer unique addresses into URL Internet addresses, and receiving the URL request data; and
   a firewall and router connected to the ground proxy server to protect the switch center and route information within the switch center.

10. The aircraft satellite communications system of claim 9 wherein the ground proxy server further recognizes graphical Internet files requested by the client computer and compresses the graphical Internet files using a real-time data compression technique before being forwarded to the client computer.

11. The aircraft satellite communications system of claim 8 wherein the telephone system is connected to an Internet service provider for interfacing the Internet.

12. An aircraft satellite communications system for distributing a direct broadcast satellite Internet service from an Internet to an aircraft comprising:
   the aircraft further comprising a direct broadcast satellite receiver system, an aircraft computer network, and back-channel communications system equipment;
   a direct broadcast satellite said direct broadcast satellite transmitting the direct broadcast satellite Internet service to the direct broadcast satellite receiver system in the aircraft;
   a back-channel communications system for communicating with the aircraft back-channel communications equipment to provide an interactive Internet service for the aircraft computer network using a unique ID for a client computer URL request; and
   a direct broadcast satellite ground station for providing the direct broadcast satellite Internet service to the direct broadcast satellite wherein the direct broadcast satellite ground station further comprises a communications data content aggregator to interface the Internet said communications data content aggregator further comprising:
      communications software for sending the client computer URL request for a Web page from the client computer received over the back-channel communications system according to the unique ID placed on the URL request by an aircraft network server; and
      a data queue manager for receiving the URL request for a Web page from the communications software and forwarding the URL requested Web page to the client computer in accordance with priorities.

13. An aircraft satellite communications system for distributing a direct broadcast satellite Internet service from an Internet to an aircraft comprising:
   the aircraft further comprising a direct broadcast satellite receiver system, an aircraft computer network, and wireless back-channel communications system equipment wherein the aircraft computer network further comprises:
      a data bus connected to the direct broadcast satellite receiver system for distributing the Internet service;
      an aircraft network server connected to the data bus for receiving the Internet service;
      a modem connected to the aircraft network server for sending and receiving data on the wireless back-channel communication system equipment; and
      a client computer connected to the aircraft network server for browsing the Internet, entering a URL request, and receiving Internet service wherein the aircraft network server attaches a unique ID to the client computer URL request;
   a direct broadcast satellite said direct broadcast satellite receiving uplink direct broadcast satellite television programming and the Internet service and transmitting satellite television programming and the Internet service to the direct broadcast satellite receiver system in the aircraft;
   a direct broadcast satellite ground station for transmitting uplink direct broadcast satellite television programming and the Internet service to the direct broadcast satellite said direct broadcast satellite ground station further comprising a direct broadcast satellite television program source and an Internet interface;
   a wireless back-channel communications system for providing interactive Internet service to the aircraft said back-channel communications system further comprising a back-channel ground station for communicating with the aircraft back-channel communications system equipment and for receiving data from the modem comprising the URL request;
   a telephone system connected to the back-channel communications system ground station for communicating with the back-channel ground station; and
   a switch center connected to the telephone system said switch center receiving the URL request with the unique ID over the back-channel communications system and the telephone system from the aircraft and sending the URL request to the Internet.

14. The aircraft satellite communications system of claim 13 wherein the direct broadcast satellite ground station further comprises a communications data content aggregator to interface the Internet.

15. The aircraft satellite communications system of claim 14 wherein the communications data content aggregator further comprises:
   communications software for sending the URL request for a Web page from the client computer according to the unique ID placed on the URL request by the aircraft network server; and
   a data queue manager for forwarding the requested Web page received from the communications software to the client computer.

16. The aircraft satellite communications system of claim 15 wherein the data queue manager maintains a constant bandwidth over a direct broadcast satellite channel by trading core programming for client computer Internet use and returning bandwidth back to the core programming when the client computer relinquishes the direct broadcast satellite channel.

17. The aircraft satellite communications system of claim 13 wherein the aircraft further comprises an in-flight entertainment system said in-flight entertainment systems further comprises:
   an antenna for receiving direct broadcast satellite television programming and Internet service;
   an antenna interface unit for mounting and positioning the antenna beam and down converting the direct broadcast satellite television programming and Internet service;
   an antenna control unit for controlling the antenna and antenna interface unit so that the antenna beam constantly points at the direct broadcast satellite;
   a splitter connected to the antenna interface unit for splitting the down converted direct broadcast satellite television programming and Internet service into two signals each containing the down converted direct broadcast television programming and the Internet service;
   a receiver unit connected to the splitter for receiving and processing the split down converted direct broadcast television programming and Internet service to provide encoded video and audio output signals corresponding to the direct broadcast television programming and Internet service, for feeding back status signals to the antenna control unit to steer the antenna to lock it onto the direct broadcast television programming and Internet service received from the satellite; and
   a distribution system connected to the receiver decoder unit for distributing the encoded video and audio output signals corresponding to direct broadcast satellite television programming and Internet service to aircraft seats.

18. The aircraft satellite communications system of claim 17 wherein the direct broadcast receiver system is operably connected to the in-flight entertainment system said direct broadcast receiver system further comprising a direct broadcast satellite receiver connected to the splitter for processing the split down converted Internet service.

19. The aircraft satellite communications system of claim 13, wherein the back-channel communications system further comprises:

a radio connected to the modem for receiving data from the modem and generating a data signal; and an antenna connected to the radio for radiating the data signal.

20. The aircraft satellite communications system of claim 13 wherein the back-channel communications system further comprises a communications satellite for communicating with the back-channel ground station and the aircraft back-channel communications system radio equipment.

21. The aircraft satellite communications system of claim 13 wherein the switch center further comprises a ground proxy server for acting as an intermediary between the client computer and the Internet, translating client computer unique addresses into URL Internet addresses, and hosting an Internet session requested by the client computer.

22. The aircraft satellite communications system of claim 21 wherein the ground proxy server further recognizes graphical Internet files requested by the client computer and compresses the graphical Internet files using a real-time data compression technique before being sent to the client computer.

* * * * *